UNITED STATES PATENT OFFICE.

LEONHARD LEDERER, OF MUNICH, GERMANY.

PROCESS OF MAKING AROMATIC OXYCARBON ACIDS.

SPECIFICATION forming part of Letters Patent No. 547,611, dated October 8, 1895.

Application filed December 18, 1894. Serial No. 532,242. (Specimens.)

*To all whom it may concern:*

Be it known that I, LEONHARD LEDERER, a subject of the King of Bavaria, residing at Munich, in the Kingdom of Bavaria, Germany, have invented new and useful Improvements in the Manufacture of Oxycarbon Acids of the Aromatic Series, of which the following is a specification.

I have found that mixtures of the homologous phenols can be easily separated by converting them into the corresponding phenoxacetic acids by means of chloracetic acid, in consequence of the different degrees of solubility possessed by the said acids or of their salts.

I have discovered that the phenoxacetic acids, from which the phenols are separated by heating with hydrochloric acid, can be converted into oxycarbon acids by melting with caustic soda or caustic potash. The process is a very simple one and can be explained by the fact that the alkali separates the glycolrest: $CH_2—COOH$ under simultaneous oxidation of the side groups.

As the crude phenols can be easily obtained, the new process is admirably suited for the production of oxycarbon acids of the aromatic series.

I. One part of ortho-cresoxacetic acid,

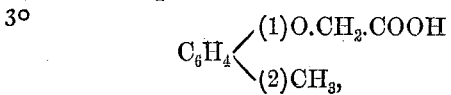

and two parts of caustic soda are heated to from 260° to 270° centigrade with the addition of a little water. The melt soon becomes quite liquid, but after some heating assumes a stiff consistency. The reaction is finished when the mixture becomes of a pulverulent form. By dissolving the melt in water and decomposing it with dilute acids the ortho-oxybenzoic acid,

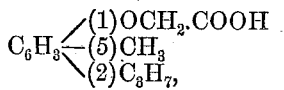

(salicylic acid,) is separated.

II. One part carvacroxacetic acid,

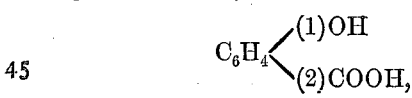

and three parts caustic soda are heated to from 250° to 260° centigrade with addition of a little water. The melt, after the passing away of the added water and that combined with the alkali, becomes pasty and assumes a yellow color, the intensity of which gradually increases and passes over to orange. The melting process is finished when the reaction mass forms an orange-brown mass of an almost dry powdery consistency. The aqueous solution of the melt is decomposed by means of dilute sulfuric acid.

III. One part thymoxacetic acid,

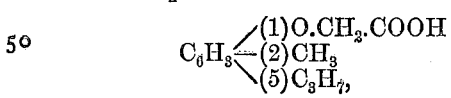

and three parts caustic soda are heated to from 240° to 250° centigrade with addition of a little water. The mixture, which after driving off the water is almost dry, becomes liquid and shortly after thickens with an orange coloration. As soon as the melt shows a deep orange-red color, the reaction is finished. If the melting process is continued until a brown-red coloration is obtained, there will be produced mainly oxyterephthalic acid,

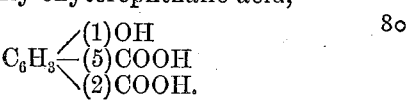

or mono-oxybenzoic acid,

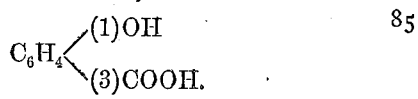

The melt mixed with water is decomposed by dilute mineral acids.

IV. One part creosoxacetic acid,

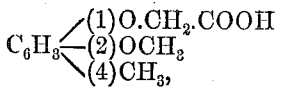

or eugenoxacetic acid,

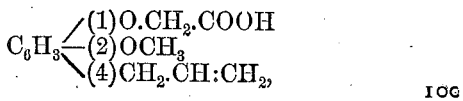

or isoeugenoxacetic acid,

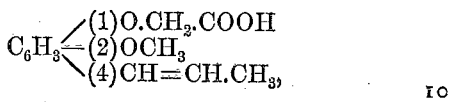

and three parts caustic soda are heated to from 230° to 250° centigrade, with addition of a little water. The reaction mass first becomes liquid, then pasty, assuming a yellow color, which rapidly becomes an orange color. After the melt has again become liquid it reassumes the pasty form, and the reaction is finished when the mass becomes a dry powder. The decomposition of the melt when mixed with water is effected, as in all other cases, by means of dilute mineral acids.

The above described process can be carried out either at atmospheric or higher pressure.

What I claim is—

The process for the manufacture of aromatic oxycarbon acids by melting the homologous phenoxacetic acids together with caustic alkalies, substantially as described.

In testimony whereof I have signed my name to this specification in the presence of subscribing witnesses.

LEONHARD LEDERER.

Witnesses:
LEONHARD WARKER,
GEORG COHN.